April 16, 1963 R. L. O'SHIELDS 3,085,587
METHOD AND APPARATUS FOR TREATMENT OF DRILLING MUD
Filed May 19, 1959 4 Sheets-Sheet 1
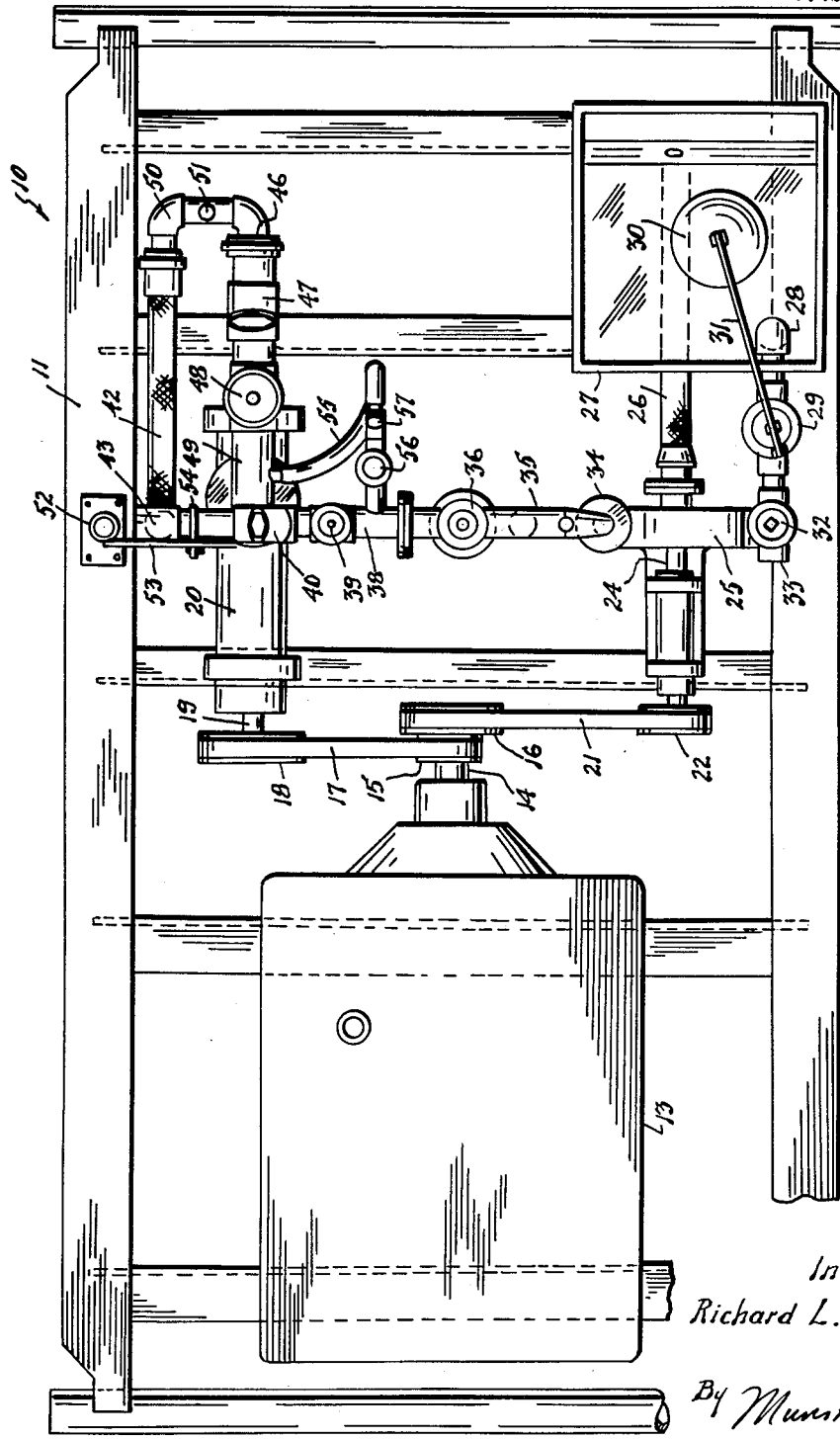
FIG. I.
Inventor:
Richard L. O'Shields
By Mumm Wharf
Atty.

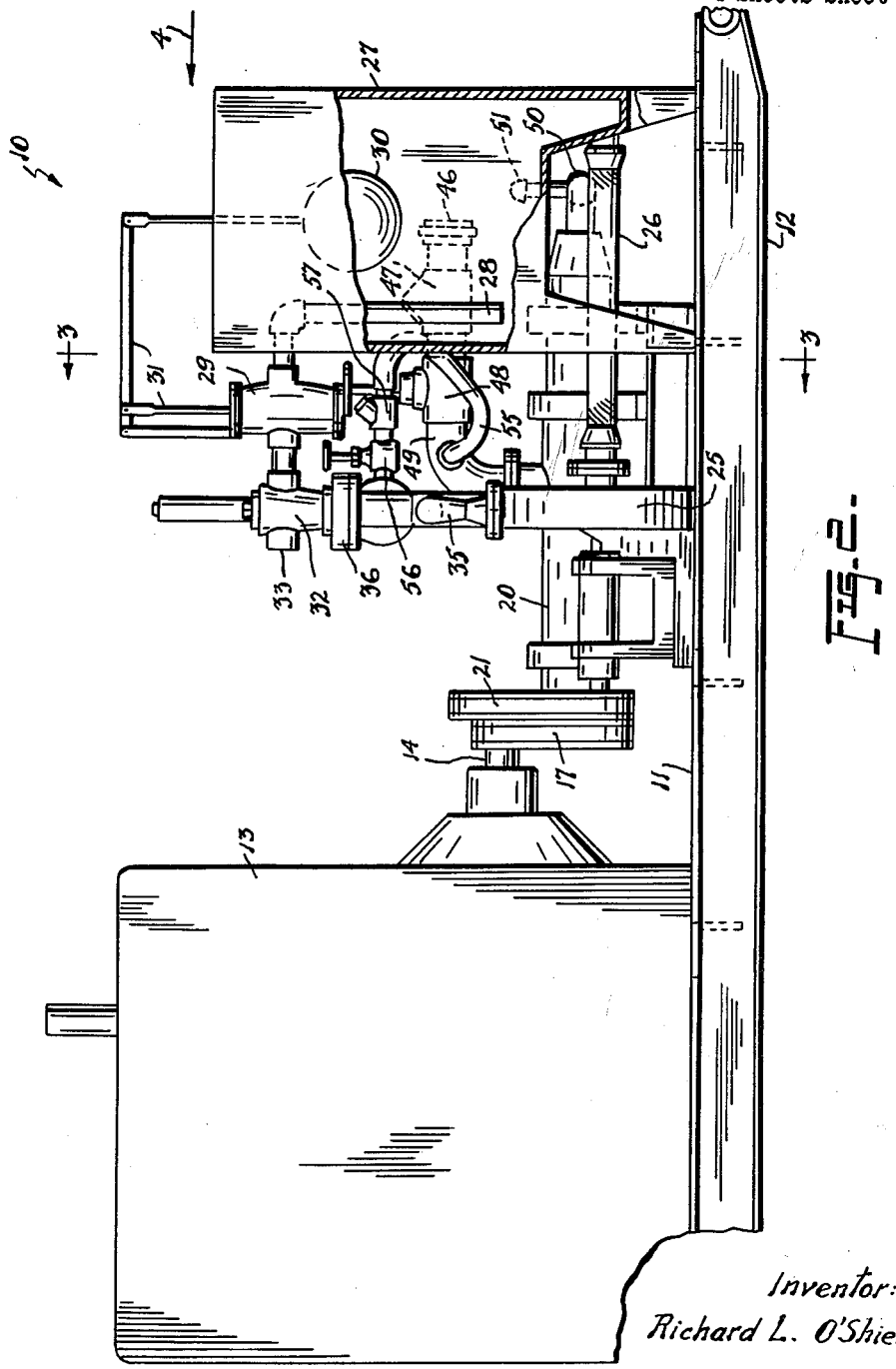

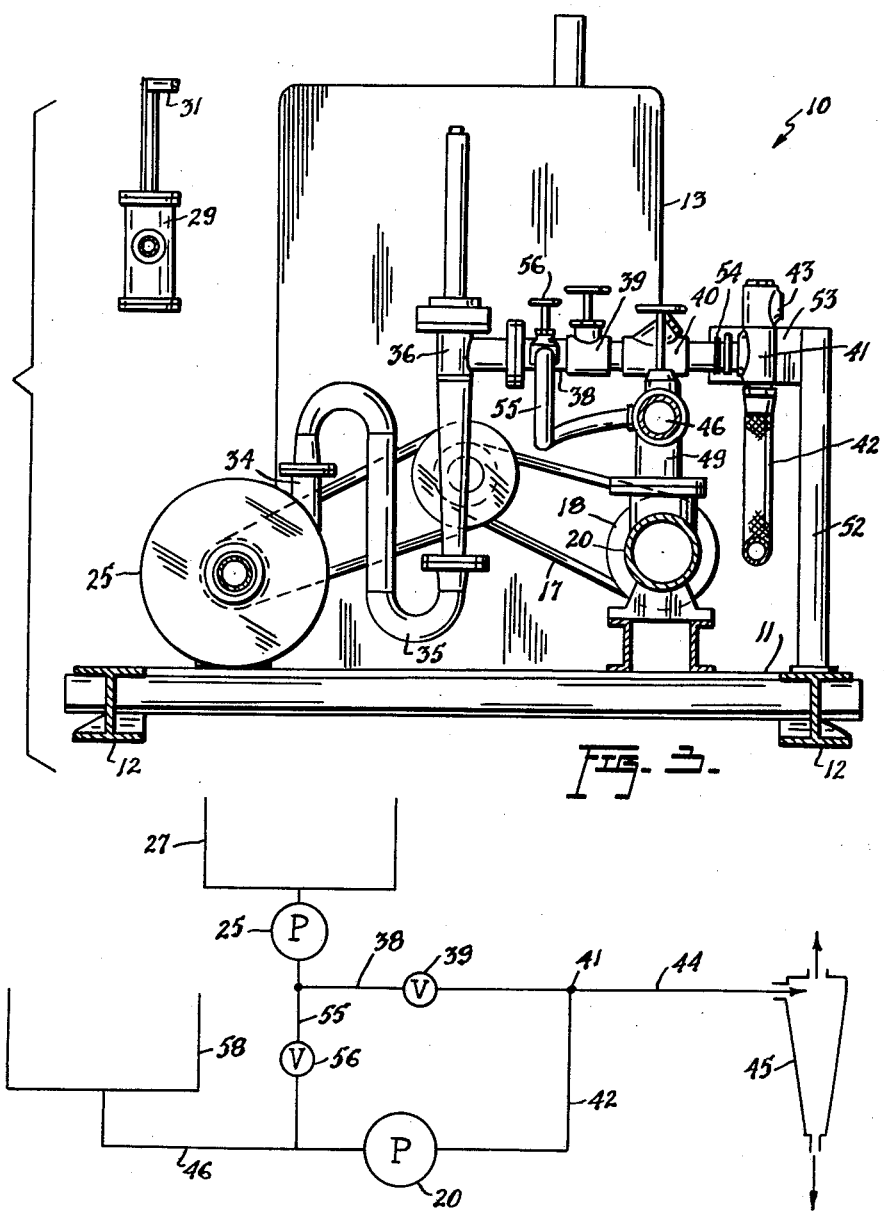

April 16, 1963 R. L. O'SHIELDS 3,085,587
METHOD AND APPARATUS FOR TREATMENT OF DRILLING MUD
Filed May 19, 1959 4 Sheets-Sheet 4
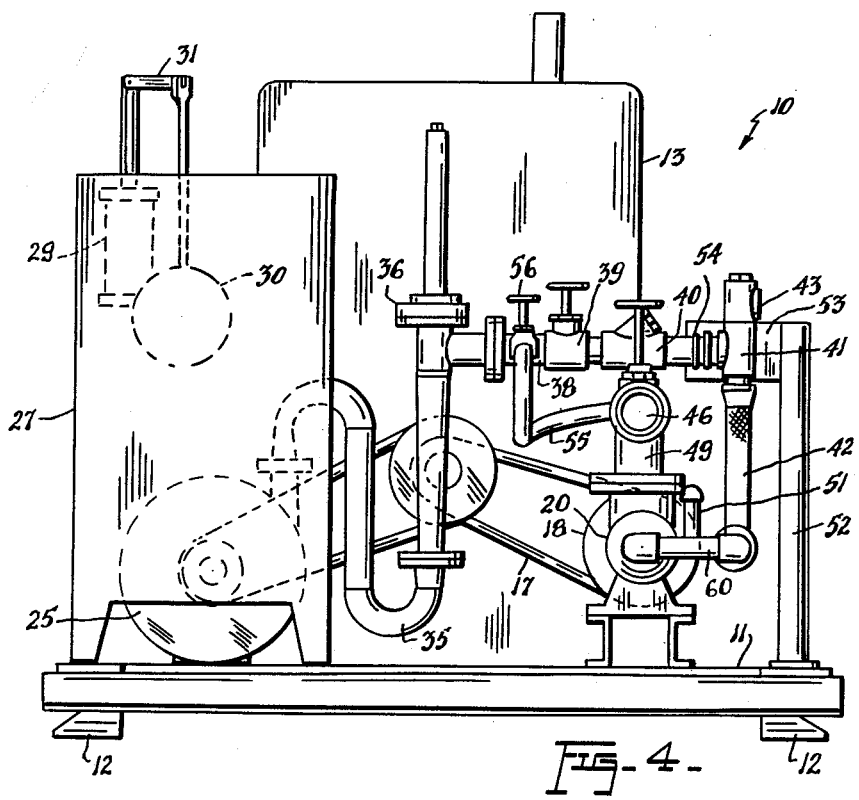
FIG-4-
Inventor:
Richard L. O'Shields
By
Mumm Khare
Atty.

United States Patent Office 3,085,587
Patented Apr. 16, 1963

3,085,587
METHOD AND APPARATUS FOR TREATMENT OF DRILLING MUD
Richard L. O'Shields, Fort Worth, Tex., assignor to Bass Brothers Enterprises, Inc., a corporation of Texas
Filed May 19, 1959, Ser. No. 814,336
9 Claims. (Cl. 137—4)

This invention relates to new and useful improvements in method and apparatus for treatment of drilling mud, and the principal object of the invention is to facilitate highly efficient and easily controlled dilution of mud with water as required to obtain the most desirable mud weight for feeding to a hydrocyclone classifier unit wherein barium sulphate is reclaimed from the mud and drilled solids such as clay are rejected.

Drilling muds which may be advantageously treated by such a classifier unit may vary in specific gravity, for example, from 1.3 to 2.2, and in order that the classifier unit may properly perform its function it is necessary that the mud fed to it be of a substantially constant volume and of an optimum specific gravity, usually lower than that of the raw mud. To obtain this optimum feed weight, the raw mud to be processed is diluted with water. The diluting step requires apparatus which is reliable, easily controlled and accurate in permitting very little or no variation in constant flow rate over a wide range of mixture ratios.

It is, therefore, an important feature of the invention to maintain a constant flow rate of mud through the dilution apparatus, which is achieved by utilizing a positive displacement pump for propelling the mud together with control valve means for introducing water into the mud selectively upstream and/or downstream of the positive displacement pump. The latter functions in the manner of a metering device, while the water is delivered by a centrifugal pump having means for maintaining a constant suction head so that it may displace a sufficiently wide range of volume flows at constant discharge pressure.

Other objects and features of the invention may become apparent from the following description taken in conjunction with the accompanying drawings, wherein like characters of reference are used to designate like parts, and wherein:

FIGURE 1 is a top plan view of the mud dilution apparatus in accordance with the invention;

FIGURE 2 is a side elevational view thereof, shown partly in vertical section;

FIGURE 3 is a vertical sectional view, taken substantially in the plane of the line 3—3 in FIGURE 2;

FIGURE 4 is an end elevational view, taken in the direction of the arrow 4 in FIGURE 2; and FIGURE 5 is a schematic diagram showing the fluid flow through the apparatus to the hydrocyclone classifier unit.

Referring now to the accompanying drawings in detail, the mud dilution apparatus in accordance with the invention is designated generally by the reference numeral 10 and embodies in its construction a suitable base 11 on which the various components are mounted, the base having skids 12 whereby the entire apparatus may be easily and conveniently transported from one site of operation to another.

A suitable prime mover 13 is mounted on the base 11 and has a drive shaft 14 carrying a relatively small pulley 15 and a relatively large pulley 16. The pulley 15 is connected by a speed-reducing belt drive 17 to a pulley 18 on the shaft 19 of a rotary, positive displacement mud pump 20, while the pulley 16 is connected by a speed-increasing belt drive 21 to a pulley 22 on the shaft 24 of a centrifugal water pump 25. The pumps 20 and 25 are suitably mounted on the base 11, as illustrated.

The water pump 25 receives water through a flexible hose 26 which communicates with the bottom of a feed tank 27 mounted on the base 11 and provided with a filler pipe 28 which extends from a valve 29 disposed exteriorly at one side of the tank. The valve 29 is actuated automatically by a float 30 disposed in the tank and operatively connected to the valve 29 by suitable linkage 31, it being apparent from the foregoing that the float-actuated valve 29 will maintain a constant water level in the tank 27 and consequently a constant suction head at the pump 25 so that the latter is capable of delivering a wide range of volume flows at approximately constant discharge pressure. The valve 29 is connected by a hand-manipulated shut-off valve 32 to a suitable source of water under pressure, the inlet of the valve 32 being indicated at 33.

The outlet 34 of the water pump 25 is connected by a conduit 35 to a suitable continuous flow indicator 36 of a conventional type, from which the water flows into a manifold 38 having a manually actuated control valve 39 therein, as well as a check valve 40. After passing through the check valve 40, the water flows into a mixing T 41 at the junction of the manifold 38 with a flexible mud delivery hose 42 leading from the aforementioned pump 20, as will be hereinafter explained. The diluted mud passes from the T 41 through an elbow 43 and through a suitable line 44 to a hydrocyclone classifier 45, as shown in FIGURE 5.

The pump 20 receives its supply of raw mud through an inlet 46 provided with a check valve 47 and with a manually controlled valve 48 which is connected by an elbow 49 to the intake of the pump, as is best shown in FIGURE 2. The outlet of the pump 20 communicates with a conduit 50 which, in turn, communicates with the aforementioned mud delivery hose 42, the conduit 50 being equipped with a suitable pressure relief valve 51. It may be noted that the outer end of the manifold 38 is supported by a standard 52 secured at its lower end to the base 11 and provided at its upper end with a bracket 53 to which the manifold is secured by a clamp 54.

Finally a water by-pass line 55 extends from the manifold 38 at a point upstream of the valve 39 and is equipped with a manually controlled valve 56, the line 55 communicating with the aforementioned elbow 49 at the intake side of the pump 20. The line 55 is also equipped with a check valve 57.

The operation of the invention will be apparent from the foregoing, particularly with reference to FIGURE 5 which diagrammatically shows the fluid flow.

The raw mud flows from its source 58 through the inlet 46 and intake elbow 49 of the positive displacement mud pump 20 and through the outlet means 42 to the mixing T 41 for delivery through the line 44 to the classifier 45. On the other hand, water from the tank 27 flows through the pump 25 into the manifold 38 where it may divide to flow through either or both the manifold into the mixing T 41 and the by-pass line 55 into the intake 49 of the pump 20. It may be noted in this connection that if fluid (water) is to flow through the valve 56, the fluid pressure in the manifold 38 must exceed that of the mud pressure at the intake side of the pump 20, and that if water is to flow through the valve 39, then the fluid pressure in the manifold must exceed the mud pressure at the outlet side of the pump 20. Of course, the mud must flow through the pump 20, which may be accomplished either by the use of the positive displacement pump as already mentioned, or by having the mud pressure at the intake higher than that at the outlet.

The hydrocyclone classifier unit 45, although schematically shown as a single unit, actually consists of several (as many as four) identical units connected in parallel and capable of operation on the basis of only one, two, three or four such units at the same time, thus providing for constant volume at any particular feed pressure with a given number of its units in operation. The classifier assembly is operated at a given feed pressure, for example, 60 p.s.i., and the pump 20 has a greater volume capacity than a single classifier unit although not as great as two or more units operating in parallel. Thus, when operating with only one classifier unit, the total flow rate of the diluted mud to the classifier is controlled by reducing the speed of the pump 20 until its output volume is equal to that of the single classifier, and controlling the dilution of the mud by the valve 56, leading to the intake side of the pump 20. Since the pump 20 is a positive acting, metering pump, only sufficient raw mud enters the pump intake to make up the difference between the volume of water passing through the valve 56 and the total volume required by the classifier. Under such circumstances the valve 39 is closed and no water flows therethrough to the classifier unit.

When two or more units of the classifier are in operation, the pump 20 at full speed does not pass enough mud therethrough to operate the classifier units at their given feed pressure, 60 p.s.i., for example, so additional water is passed through the valve 39 to obtain the given feed pressure at the classifier. Moreover, sufficient water is passed through the valve 56 to the intake of the pump 20 so that only the proper amount of raw mud flows through the pump.

In field operation the amount of water passing through the valve 56 is determined by the weight of the diluted mud fed to the classifiers. For example, it may be desired to have a 10.1 lbs. per gallon density of the feed, and on making the initial adjustment the feed density is, for example, 10.5 lbs. per gallon. The valve 56 is opened slightly to allow more water to the intake of the pump 20, thus causing a corresponding decrease in the raw mud flow to the pump and reducing the density of the dilute mud feed.

If desired, the valves 39 and 56 may be automatic in operation, the valve 56 being adapted to control the rate of flow of water therethrough in response to density sensing of the diluted mud, while the valve 39 is a pressure regulating valve actuated to maintain constant pressure in the diluted mud feed line to the classifier unit.

While in the foregoing there has been described and shown the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. In a drilling mud dilution apparatus, the combination of a metering pump having an intake connected to a source of raw mud and an outlet adapted to be connected to a mud classifier, a fluid pump having an inlet connected to a source of mud diluting fluid, a manifold connected to the outlet of said fluid pump and communicating with the outlet of said metering pump, a control valve provided in said manifold, a by-pass line extending from a point in said manifold between said fluid pump and said control valve to the intake of said metering pump, and a second control valve provided in said by-pass line.

2. The combination as defined in claim 1 together with means cooperating with said fluid source for maintaining a constant suction head in the inlet of said fluid pump.

3. In a drilling mud dilution apparatus, the combination of a metering pump having its intake connected to a source of raw mud and an outlet adapted to be connected to a mud classifier, a manifold communicating with the outlet of said metering pump, a fluid pump having its inlet connected to a source of mud diluting fluid and an outlet communicating with said manifold, means cooperating with said fluid source for maintaining a constant suction head in the inlet of said fluid pump, a by-pass line extending from said manifold to the intake of said metering pump, a control valve provided in said by-pass line, a control valve provided in said manifold at a point between the by-pass line and the outlet of the metering pump, and a control valve provided on the intake of the metering pump upstream of the point of connection of said by-pass line thereto.

4. The combination as defined in claim 3 wherein said means for maintaining a constant suction head in the outlet of said fluid pump comprise a tank having the inlet of the fluid pump in communication therewith, a fluid delivery line for said tank, and valve means provided in said delivery line, and means responsive to constant fluid level in the tank for actuating said valve means.

5. A method comprising the steps of passing a stream of drilling mud from a mud source to a constant volume metering station, metering a constant volume of said mud at said station and passing the metered mud under pressure from said station through a mud outlet passage, passing a stream of mud diluting fluid under pressure from a source of diluting fluid through an outlet communicating with a passage leading to the mud outlet passage to effect mixing of the mud and diluting fluid at a point downstream from the metering station, passing a portion at least of the stream of diluting fluid for admixture with the mud upstream from the metering station and controlling both the upstream and downstream flow of diluting fluid discharged into the mud stream.

6. The method of claim 5 wherein a substantially constant flow of diluting fluid under pressure is maintained prior to by-passing.

7. A method as set forth in claim 5 wherein the diluted mud downstream from the metering station is passed to a mud classifying station.

8. A method which comprises passing a stream of drilling mud from a mud source to a mud classifying station, metering a constant volume of the stream of mud at a constant volume metering station intermediate the source and the classifying station, and diluting the mud stream by introducing a diluting fluid to the mud stream selectively upstream and downstream with reference to the metering station, and controlling the relative quantities of diluting fluid so introduced.

9. In a drilling mud diluting apparatus, the combination of metering means comprising a positive displacement pump for propelling a mud stream through an outlet passage downstream from the pump, said pump having an inlet connected with a source of drilling mud for introducing a mud stream to the pump, and control valve means for introducing diluting fluid to the mud stream selectively upstream and downstream with reference to the positive displacement pump.

References Cited in the file of this patent

UNITED STATES PATENTS

| | | |
|---|---|---|
| 1,531,808 | Parkinson | Mar. 31, 1925 |
| 2,234,561 | Kittredge | Mar. 11, 1941 |
| 2,288,719 | Kerr | July 7, 1942 |
| 2,955,753 | O'Conner et al. | Oct. 11, 1960 |